United States Patent [19]

van der Wiel

[11] Patent Number: 4,623,119

[45] Date of Patent: Nov. 18, 1986

[54] PLUG VALVE

[75] Inventor: Hans M. van der Wiel, Upland, Calif.

[73] Assignee: Johnston Pump/General Valve, Inc., Glendora, Calif.

[21] Appl. No.: 792,043

[22] Filed: Oct. 28, 1985

[51] Int. Cl.[4] .............................................. F16K 25/00
[52] U.S. Cl. .................................... 251/163; 251/161; 251/188
[58] Field of Search ............... 251/158, 160, 161, 162, 251/163, 187, 188

[56] References Cited

U.S. PATENT DOCUMENTS 2,612,340  9/1952  Laurent ........................... 251/163 X

FOREIGN PATENT DOCUMENTS 492528  5/1953  Canada ................................ 251/163

Primary Examiner—Harold W. Weakley
Attorney, Agent, or Firm—Leonard Tachner

[57] ABSTRACT

An improved plug-type valve of the type having a plug connected to slips wherein opening and closing the valve involves both vertical and rotational motion of the plug, the novel features of the invention residing in geometrical characteristics of plug, slips and valve body to make the vertical motion of the plug, both prior to and subsequent to the rotation of the plug and slips, unidirectional. Thus, unlike prior art plug-type valves wherein opening the valve may require a sequence comprising vertical upward motion, rotation and vertical downward motion, in the present invention the opening sequence comprises vertical upward motion, rotation and vertical upward motion. This unidirectional vertical component of plug motion both before and after plug and slip rotation, significantly reduces the complexity and cost of the operator or actuator to which the plug is connected by the trunnion.

4 Claims, 8 Drawing Figures

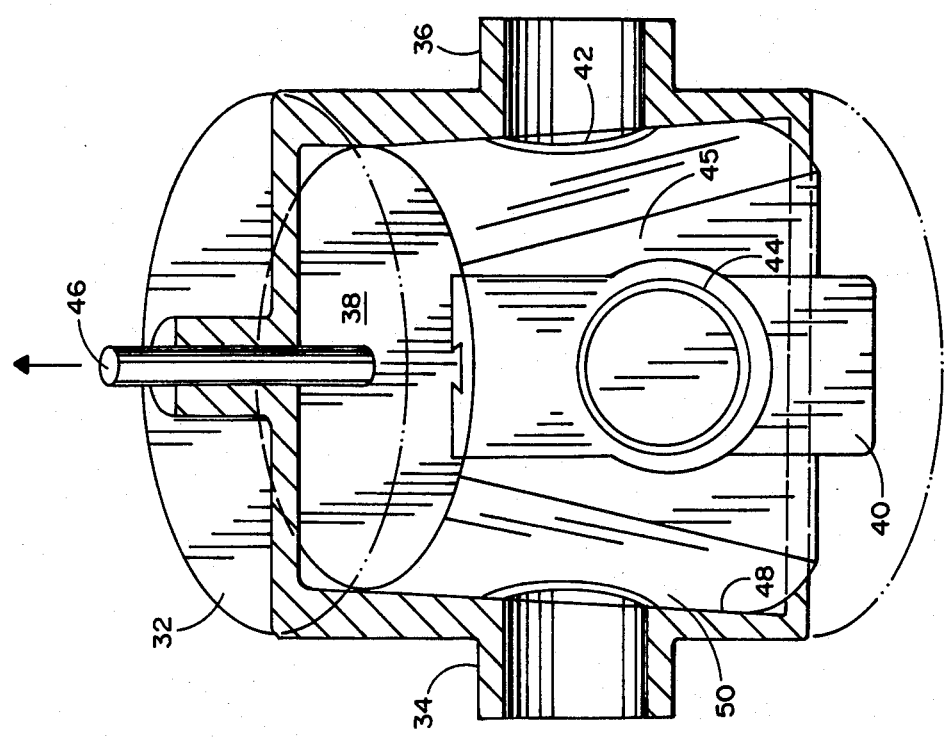
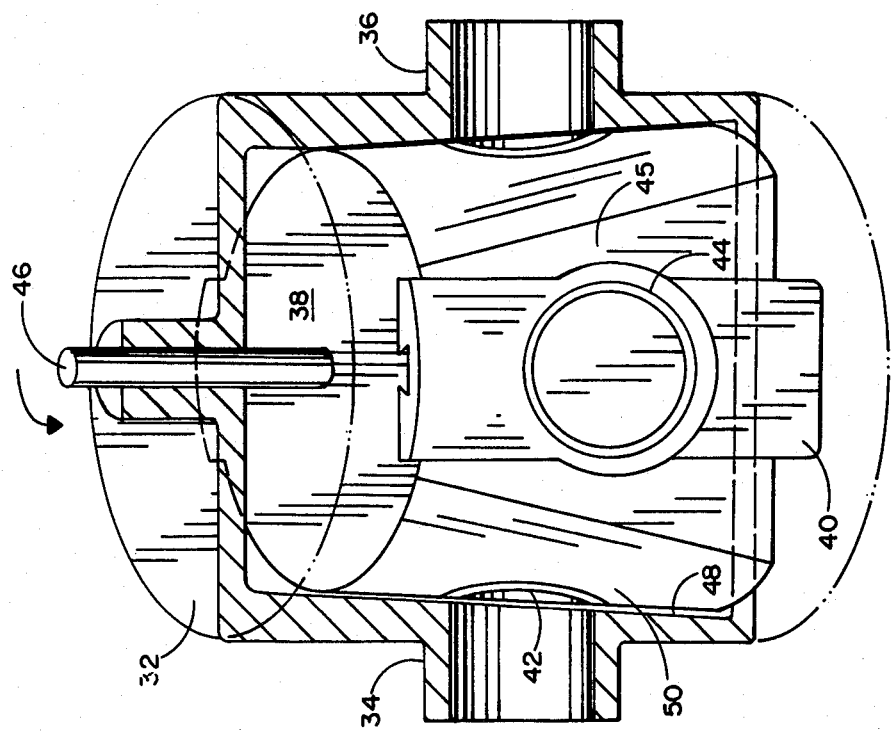

PLUG VALVE

BACKGROUND OF THE INVENTION

1. Field of the Invention

The present invention relates generally to plug-type valves and more specifically, to an improved plug-type valve in which the vertical motion of the plug between the open position of the valve and the closed position of the valve is unidirectional and wherein the vertical motion of the plug between the closed position of the valve and the open position of the valve is also unidirectional.

2. Prior Art

Plug-type valves are well-known in the art. Often such plug-type valves are implemented with slips and seals in a seat and reseat configuration. The slips and seals provide means for blocking the flow through the valve at both the inlet and outlet ports when the valve is in the closed position. This permits maintenance personnel to bleed the valve body with the valve in its closed position with a minimum expenditure of time and labor costs. Typically, the plug and slips are interconnected so that in opening the valve from its fully closed position, the first motion of the plug is vertical in one direction which has the effect of retracting the slips from the inside surface of the valve body in order to prevent scoring of the valve seals in the subsequent motion when the valve is turned to place the flow passage to be in line with the inlet and outlet. However, in conventional plug-type valves which employ slips and seals as described above, after the flow passage has been aligned with the inlet and outlet, vertical motion of the plug is then again required in a direction opposite to that of the initial vertical motion which retracted the slips. This second oppositely directed vertical motion in effect reseats the valve by placing the flow passage in the plug in intimate contact with the inlet and outlet respectively.

Although such seat and reseat valves have had good commercial success, the aforementioned motion of the plug in opening or closing the valve, namely, vertical motion in a first direction, the 90 degrees rotation and then vertical motion in a second direction opposite to the first, generally increases the cost of the valve because of the complexity of the operator mechanism to which the plug is connected. The operator mechanism is complex because it has two stem sets to transform the aforementioned vertical motion, rotational motion and oppositely directed vertical motion into a undirectional motion in a hand operator or automatic operator. Consequently, the cost of manufacture, maintenance and repair of such a complex operator is higher than it would be if it were possible to simplify the motion of the plug between the valves open and closed positions. For example, if it were possible to design a plug-type valve in which the motion of the plug were vertical, rotational and vertical in opening and closing, wherein both vertical portions of the operation sequence were in the same direction for opening the valve and in the same direction for closing the valve, then the operating mechanism to which the plug trunnion were attached would be significantly simpler. The operator would also be less costly to manufacture, maintain and repair thereby reducing the overall costs for the valve while still providing a double block and bleed feature of the prior art valves described above as well as the reseat feature which allows the slips to be changed without draining the line.

SUMMARY OF THE INVENTION

The present invention provides the aforementioned simplification of the operator portion of a plug-type valve by simplifying the motion of the plug during opening and closing of the valve. More specifically, the present invention provides a plug-type valve of a unique configuration in which the vertical motion of the plug both before and after the 90 degrees of rotation of the plug between the open and closed position is unidirectional. That is for example, in contrast to the prior art conventional plug-type valve herein described wherein the typical motion of the plug during the opening of the valve from a fully closed position is vertical upward motion, 90 degrees of rotation and vertical downward motion, the present invention provides a plug-type valve in which the motion of the plug in opening the valve from a fully closed position is vertically upward than 90 degrees of rotation and then vertically upward again. Similarly, in closing the plug from its fully open position, the motion of the plug is vertically downward, then 90 degrees of rotation and then vertically downward again. As a result of the simplification of plug motion in the present invention, the operator mechanism to which the plug is connected by means of a trunnion can be significantly reduced in complexity and cost as previously described.

The unique significant improvement in plug motion provided by the present invention is achieved by means of innovative changes in the shapes of the plug, slips and the interior surface of the valve body as compared to conventional prior art plug-type valves. More specifically, as it will be seen hereinafter in more detail, the interior surface of the valve body adjacent the plug is conical in the present invention as it is in the prior art. The truncated cone of the interior surface is in effect inverted in the present invention. Thus, for example in the prior art illustrated herein, the interior surface of the valve body forms a truncated cone in which the upper end of the valve body has a diameter which is greater than the lower end of the valve body.

In the present invention the upper end of the valve body has a diameter which is smaller than the diameter of the valve at the lower end of the body. Furthermore, in contrast to prior art conventional plug-type valves in which all of the surfaces of the plug tend also to be conical with a larger diameter at the top and a smaller diameter at the bottom, in the present invention two of the surfaces of the plug, namely, those two surfaces which are adjacent and which define the ports of the flow passage through the plug are, in effect, conically inverted as compared to the prior art in that these two surfaces adjacent the flow passage diminish in radius toward the upper portion of the plug. On the other hand, in order to preserve the slip retracting feature of the prior art, the surfaces of the plug of the present invention which interface with the slips are canted in a conventional manner. That is, the distance between these two surfaces increases toward the top of the plug.

To compensate for the decreasing diameter of the inner surface of the valve body and the increasing distance between the slip interface surfaces of the plug toward the top of the plug, the slips are thicker at the bottom of the plug and thinner at the top of the plug whereas in conventional prior art plug-type valves, the slips are typically of constant thickness along their entire lengths.

OBJECTS OF THE INVENTION

It is therefore a principal object of the present invention to provide an improved plug-type valve wherein the valve can be opened or closed with unidirectional vertical motion.

It is an additional object of the present invention to provide an improved plug-type valve in which unidirectional vertical motion of the plug for either opening or closing the valve significantly simplifies the valve operator.

It is still an additional object of the present invention to provide an improved plug-type valve having a uniquely shaped plug and valve body interior surface, the latter of which is conical in a direction that is inverted as compared to conventional prior art plug valve body surface interiors.

It is still an additional object of the present invention to provide an improved plug-type valve having a uniquely shaped plug in which the plug surfaces adjacent the flow passage through the plug define a cone which is similar to but smaller than the cone defined by the interior surface of the valve body; in which the slip surfaces adjacent the valve body define a cone which is substantially congruent to the cone defined by the interior of the valve body; and wherein the plug surfaces adjacent the slips are canted in a direction opposite to the aforementioned cones.

BRIEF DESCRIPTION OF THE DRAWINGS

The aforementioned objects and advantages of the present invention as well as additional objects and advantages thereof will be more fully understood hereinafter as a result of a brief description of a preferred embodiment of the invention when taken in conjunction with the following drawings in which:

FIG. 7 is a cross-sectional view of the plug valve of the present invention after the quarter-turn rotation of the plug and slips for placing the flow passage parallel to the inlet and outlet; and FIG. 8 is a cross-sectional view of the plug valve of the present invention after the second vertical upward motion of the plug to "reseat" the plug and align the flow passage with the inlet and outlet.

DETAILED DESCRIPTION OF A PREFERRED EMBODIMENT

Figure 1:
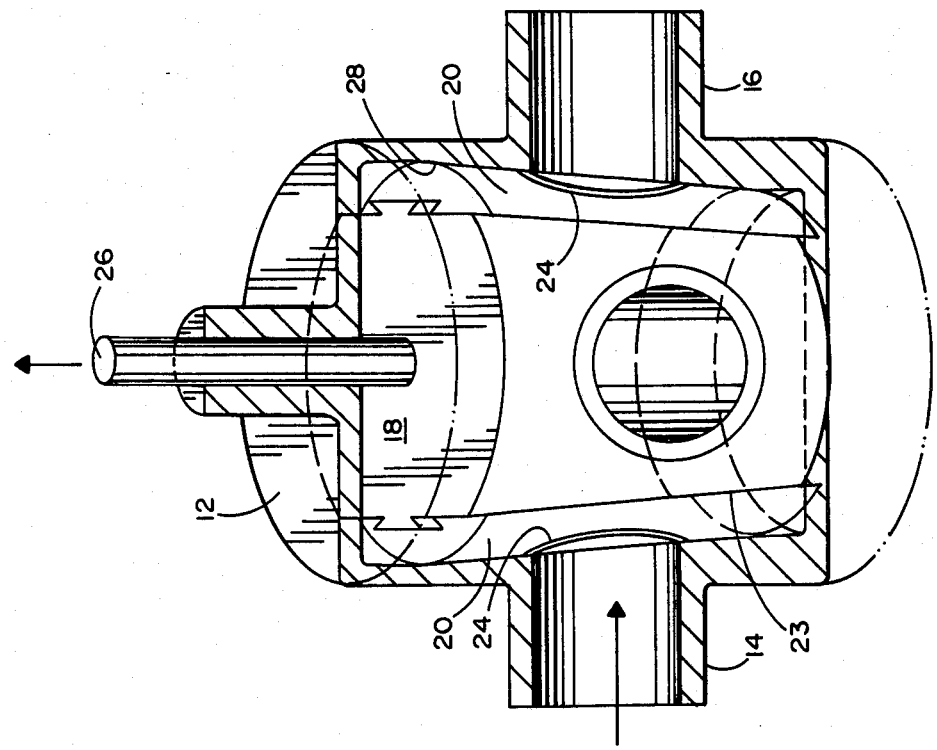
FIG. 1 is a cross-sectional view of a prior art plug valve in its fully closed configuration.

In order to provide a better understanding of the present invention, reference will first be made to FIGS. 1 through 4 which show a prior art plug-type valve in various configurational changes between its fully closed and fully opened positions. Therefore, referring first to FIG. 1 it will be seen that a conventional plug valve 10 of the prior art comprises a valve body 12 having an inlet 14, an outlet 16 and a plug 18, the latter connected by means of dovetail interconnection to a pair of slips 20. Plug 18 also comprises a flow passage 22 which, in the valve's fully closed position as seen in FIG. 1, is substantially perpendicular to the inlet 14 and the outlet 16. As seen further in FIG. 1, the plug 18 is connected to a trunnion 26 which is connected in turn to a mechanical operator (not shown) which is adapted to apply the necessary vertical and rotational motion to the trunnion and plug in order to open and close the valve.

The shape of the plug 18 combined with the slips 20 and of the interior surface 28 of the valve body 12 are substantially conical or conical truncations with the larger diameter of respective geometries being greatest at the top of the valve body and smallest at the bottom of the valve body. In other words, the apex of the cones defining the shape of the interior surface 28 of the valve body 12 and of the plug and slip combination would be positioned somewhere below the valve 10 along the axis through the trunnion 26. Furthermore, it will be seen that the slips 20 are in this prior art configuration, of substantially constant thickness throughout their height between the lower portion of the valve body and the upper portion thereof. Consequently, in the closed position of the valve as illustrated in FIG. 1, the plug 18 is in its lowermost position thereby extending the slips 20 toward the inlet and outlet respectively whereby a pair of seals 24 are in compressed engagement with the interior surface of the valve body 28 immediately adjacent the inlet and outlet passages. This compressed engagement of the seals 24 with the surface surrounding the inlets and outlets 14 and 16 respectively, assures that there is flow blockage of both the inlet and outlet while the valve is in its fully closed position as illustrated in FIG. 1.

Figure 2:
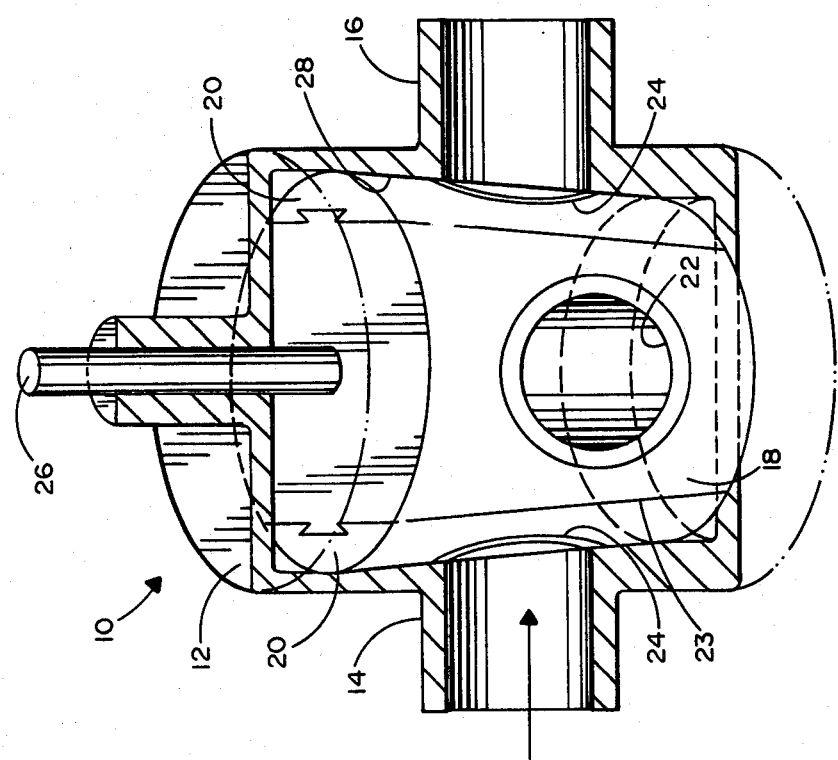
FIG. 2 is a cross-sectional view of a prior art plug valve after the vertical upward motion of the plug for retracting the slips.

In order to open the prior art plug valve of FIG. 1, the first motion of plug 18 is vertically upward as illustrated in FIG. 2. As seen in FIG. 2, the configuration of the valve shown therein is substantially identical to that shown in FIG. 1 with the exception of the relative vertical position of the plug 18 and trunnion 26 with respect to the remaining portions of the valve 10. Furthermore, because the plug 18 has been moved upwardly as shown by the arrow at the top of FIG. 2, the relationship created by the dovetail interface between the plug 18 and the slips 20 along the plug/slip interface surface 23, causes the slips 20 to be retracted from the interior surface 28 of the valve body 12 immediately adjacent the inlet 14 and outlet 16. This retraction of the slips 20 disengages the seals 24 from the valve body surface thereby permitting rotation of the plug and attendant slips through a 90 degree turn to align the flow passage in a direction substantially parallel to the access through inlet 14 and outlet 16.

Figure 3:
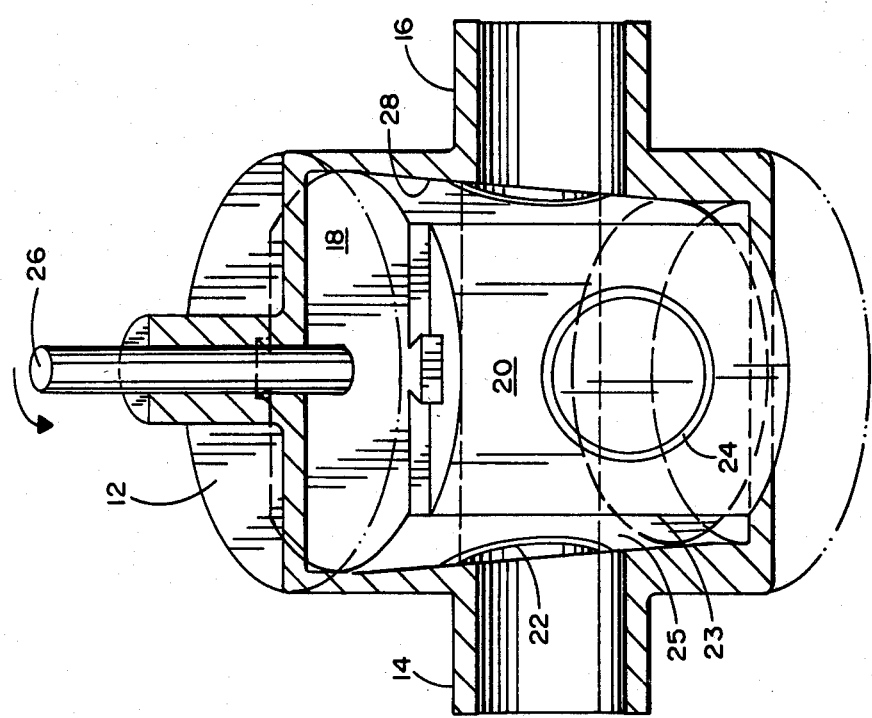
FIG. 3 is a cross-sectional view of a prior art plug valve after the quarter-turn rotation of the plug and slips for placing the flow passage parallel to the inlet and outlet.

This third step in the process of opening the prior art valve of FIGS. 1 through 4 is illustrated in FIG. 3. More specifically, as seen in FIG. 3, the trunnion 26 and therefore the plug 18 to which the trunnion is affixed, have been rotated through an angle of substantially 90 degrees. As a result, the passage 22 is now at the appropriate angle to be aligned with the inlet and outlet. However, because it was necessary to retract the slips 20 for the rotation step of FIG. 3 and therefore move the plug upwardly with respect to the slips, it will be seen that flow passage 22 is elevated above the inlet and outlet 14 and 16. Furthermore, it should be understood that the plug 18 is not properly seated in its open position with the plug surfaces 25 engaging the body interior surface 28 adjacent the inlet and outlet, respectively.

Figure 4:
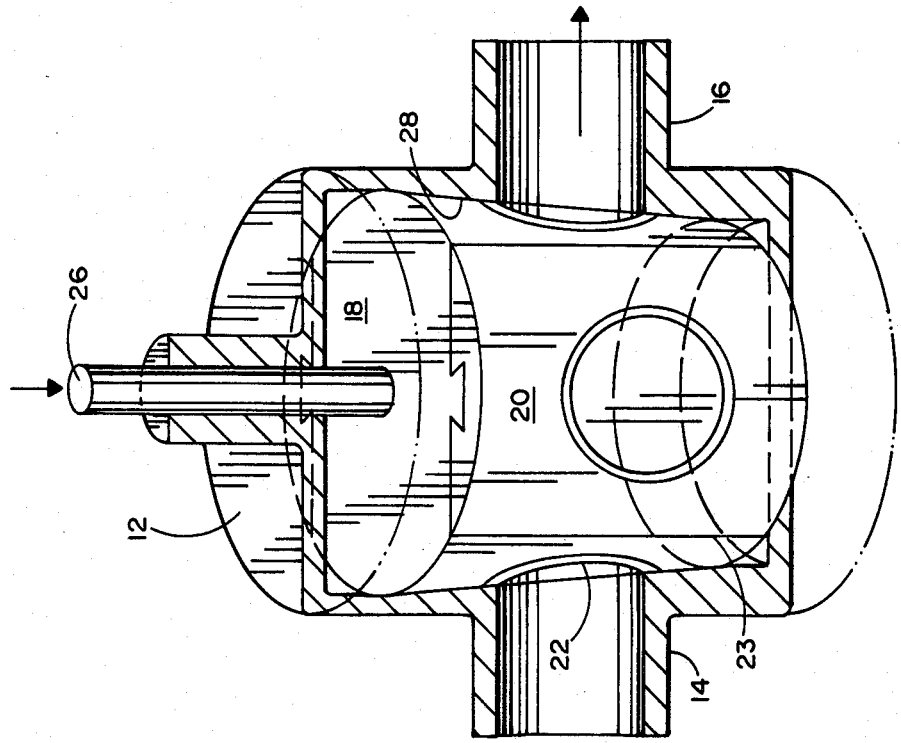
FIG. 4 is a cross-sectional view of a prior art plug valve after the vertical downward motion of the plug to reseat the plug and align the flow passage with the inlet and outlet.

This final seating configuration is attained by the step illustrated in FIG. 4. More specifically, as shown in FIG. 4, a downward vertical force is applied to the trunnion 26 and therefore plug 18, causing the plug 18 to move vertically downward until the flow passage 22 is aligned with the inlet 14 and the outlet 16 so that all three are coaxial and the plug 18 is properly seated whereby the plug surface 25 firmly engages body interior surface 28.

In observing the valve configurations of FIGS. 1 through 4 it will also be observed that the plug 18 is, in combination with the slips 20, substantially symmetrical about its entire radial surface relative to the axis through the trunnion 26. That is, the combination of the plug 18 and the slips 20 forms a substantially circular conical truncation which is substantially congruent to the body interior surface 28 of valve body 12 in that the largest lateral dimension thereof is at the top or uppermost portion of the valve body 12 and the smallest lateral dimension thereof is at the bottom or lowermost portion of valve body 12.

Reference will now be made to FIGS. 5 through 8 which illustrate the various configuration stages of the present invention analogous to FIGS. 1 through 4 for the prior art valve. As it will be seen hereinafter, there is a substantial reduction in the complexity of the motion of the plug of the present invention as compared to that of the prior art.

Figure 5:
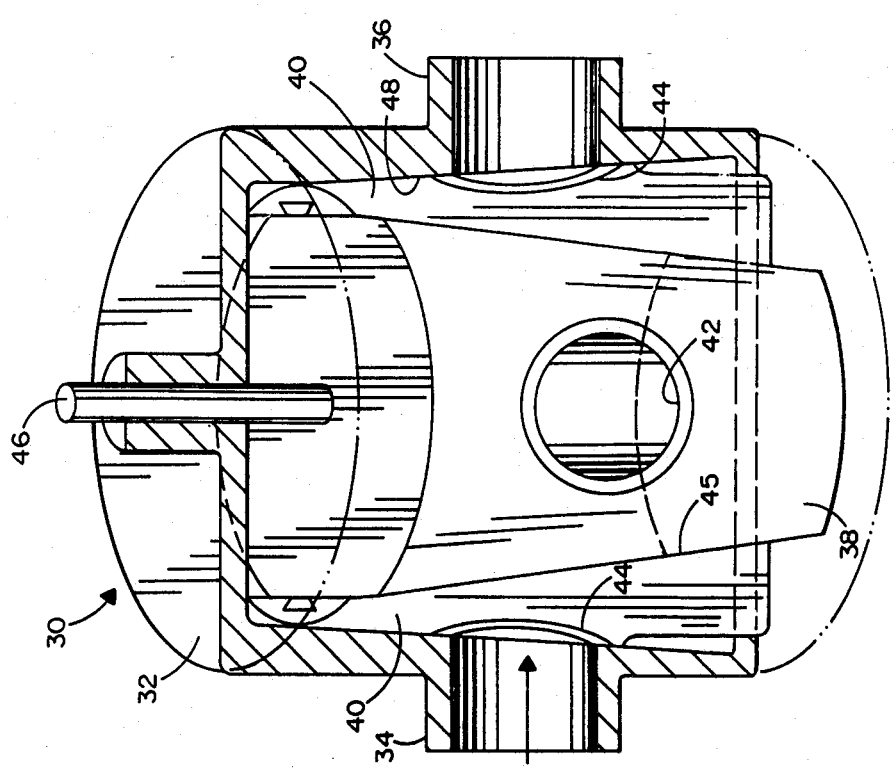
FIG. 5 is a cross-sectional view of the plug valve of the present invention in its fully closed configuration.

Referring first to FIG. 5 it will be seen that the plug valve 30 of the present invention comprises a valve body 32 having an inlet 34, an outlet 36, a plug 38 connected to a pair of slips 40 and defining a flow passage 42. Because the valve is shown in FIG. 5 in its fully closed position, flow passage 42 is substantially perpendicular to the axis through inlet 34 and outlet 36.

The slips 40 are connected to the plug 38 in a substantially similar fashion to the prior art plug-type valve of FIGS. 1 through 4, namely, by means of a dovetail interface along the plug/slip interface surface 45. Slips 40 are provided with seals 44 in order to provide a compressive engagement between the slips and the interior surface 48 of the valve body 32 similar to that previously described for the prior art plug-type valve of FIGS. 1 through 4. In addition, the plug-type valve of the present invention is provided with a trunnion 46 which is connected coaxially to the plug 38 and performs the same function as trunnion 26 of the prior art valve.

Two of the novel geometric features of the present invention may be observed in FIG. 5. More specifically, by comparing FIGS. 5 and 1, it will be seen that in the plug valve 30 of the present invention the conical shape defined by the body interior surface 48 of the valve body 32 is inverted as compared to the conical shape of the prior art valve of FIG. 1. More specifically, it will be seen that the cone or truncation thereof defined by the interior surface 48 has its largest lateral dimension at the lowermost portion of the valve body 32 and its smallest lateral dimension at the uppermost portion of the valve body. In contrast to the cone defined by the interior surface 28 of the valve body 12 of FIG. 1, the apex of the cone defined by the interior surface 48 of the present invention would be located above the valve 30 along the axis of trunnion 46. An additional geometrical feature of the present invention which may be observed in FIG. 5 is the difference in shape of the slips 40 of plug valve 30 as compared to the slips 20 of prior art plug valve 10. More specifically, as seen in FIG. 5 slips 40 are wedge-shaped in that the lowermost portion of the slips are substantially greater in thickness than the uppermost portion of the slips. This is in contrast to the shape of the slips 20 of FIG. 1 from which it can be seen that those prior art slips are of constant thickness throughout the height of the plug valve.

As in the case of the prior art plug valve 10 of FIGS. 1 through 4, the first step in opening the valve of the present invention shown in FIG. 5 is to apply a vertically upward motion to the trunnion 46 and therefore the plug 38 to retract the slips 40 from the interior surface 48 immediately adjacent the inlet 34 and outlet 36. As in the case of the prior art valve, this slip retraction is intended to disengage the seals 44 from the body interior surface 48 so that the plug and slip combination can be rotated within the valve body 32 without scoring the interior of the valve or damaging the slip seals 44. This first step in the process of opening the valve of the present invention is illustrated in FIG. 6 and as can be seen by comparing FIGS. 6 and 5 there is a difference between the two in only the vertical position of the plug 38 and the retracted position of the slips 40 relative to the interior surface adjacent the inlet 34 and outlet 36.

The next step in the process of opening the valve 30 of the present invention is illustrated in FIG. 7 wherein the trunnion 46 and therefore the combination of plug 38 and slips 40 have been rotated 90 degrees to place the flow passage 42 in a direction which is in line with the axis through inlet 34 and outlet 36. However, it will be seen in analysis of FIG. 7 that in this configuration of the valve 30 of the present invention, the passage 42 is below the inlet 34 and outlet 36 and that further upward motion of the plug 38 is necessary to seat the plug in its fully open position. This is accomplished in the final step of the opening process illustrated in FIG. 8. However, before referring to FIG. 8 specifically for this purpose, it will be observed that in both FIGS. 7 and 8 the plug surfaces 50 which are adjacent and which define the flow passage 42, define a set which is inverted relative to the cone defined by the plug surfaces 25 of the prior art valve of FIGS. 1 through 4. This is a third significant geometrical feature of the present invention. It will be observed that the lateral distance through the plug 38 between the points on the surfaces 50 on opposite sides of the plug, decrease as one approaches the uppermost portion of the valve body 32 just as the corresponding distances between points on the interior surface 48 of the valve body 32 decrease in distance as one approaches the uppermost portion of the valve body.

Figure 6:
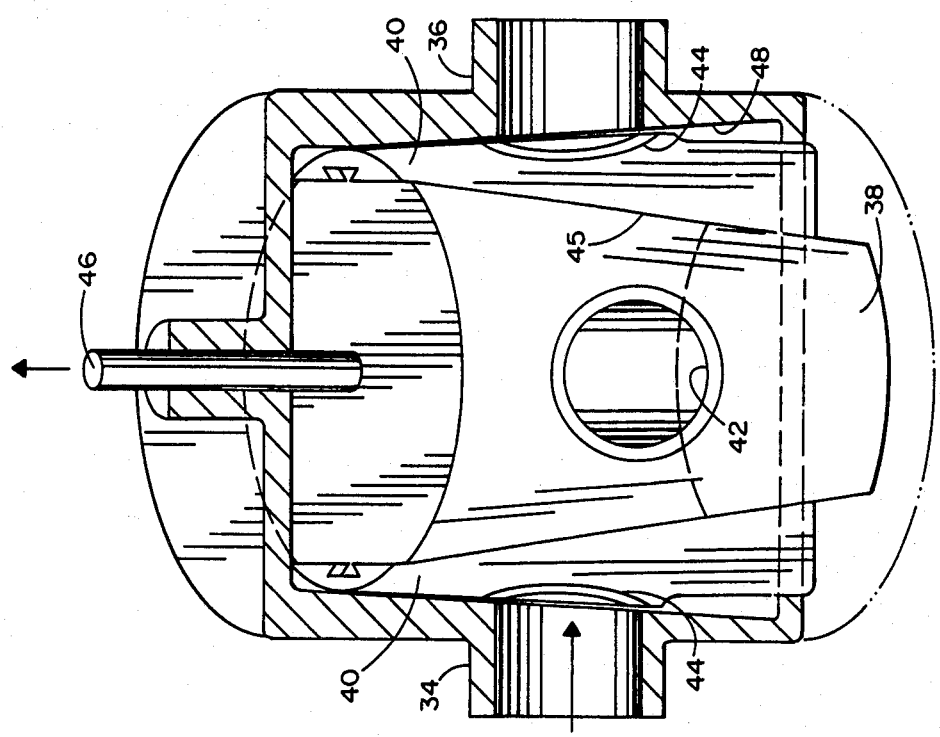
FIG. 6 is a cross-sectional view of the plug valve of the present invention after the initial vertical upward motion of the plug for retracting the slips.

The relationship between the interior surface 48 and plug surfaces 50 facilitates the last step of the opening of the valve 30 to take place as illustrated in FIG. 8 wherein the plug is now moved vertically upward in the same direction that it was moved in the step corresponding to FIG. 6 and in the opposite direction as compared to the reseat vertical motion of the prior art valve shown in FIG. 4. Thus, unlike the prior art valve of FIGS. 1 through 4 wherein opening the valve comprises the steps of moving the plug vertically upward, rotating it through 90 degrees and rotating it vertically downward, in opening the valve of the present invention the steps involve moving the plug vertically upward, rotating it 90 degrees and then finally moving it vertically upward again.

It will be understood that the steps involved in closing the respective valves are the same but in opposite sequence to that shown in FIGS. 1 through 4 and 5 through 8, respectively. Therefore, when closing the valves from their fully open positions, one may readily appreciate the difference in the present invention as compared to the prior art. More specifically, in closing the valve of FIGS. 1 through 4, one first moves the plug of the prior art valve upwardly and rotates the plug 90 degrees and then moves the plug downwardly to seat it in its closed position. On the other hand, to close the valve of the present invention illustrated in FIGS. 5 through 8, one first moves the plug downwardly, then rotates it 90 degrees and then again moves the plug downwardly. Therefore, in both opening and closing the valve of the present invention, the operational sequence involves a combination of vertical and rotational directed motion in which the vertical motion segments are unidirectional. As a result, those having skill in the art to which the present invention pertains will understand that the operator that must be utilized to control the trunnion and to transfer the unitary motion of the operator as compared to the combined motions of the plug and trunnion, can be greatly simplified because of the unidirectional vertical motion in opening and then closing the valve of the present invention.

It will now be understood by those having skill in the art to which the present invention pertains that what has been disclosed herein comprises a novel improved plug-type valve in which innovative geometric characteristics of the plug and valve body of the present invention enable it to operate for opening and closing wherein the vertical motion used in each is unidirectional. It will further be understood that the unidirectional vertical motion for opening or closing the valve of the present invention is achieved by combining a number of innovative geometrical features including effectively inverting the conical direction of the valve body interior surface, by using a pair of slips which are thicker at the bottom of the valve than they are at the top and by defining the plug surfaces adjacent the passageway to be conical in the same direction as the valve body interior surface so that in opening or closing the valve, the vertical motion prior to the 90 degree turn is in the same direction as the vertical motion subsequent to the 90 degree turn which is quite a radical departure from the prior art.

As a result of applicant's teaching herein, various modifications and additions will now be perceived by those skilled in the valve art. Such variations may for example include departures from the precise geometrical configurations illustrated herein by way of example only, while still incorporating the general concepts and geometrical features which provide the novel unidirectional vertical motion for seat and reseat operation of the present invention. However, all such modifications and additions are deemed to be within the scope of the present invention which is to be limited only by the claims appended hereto.

I claim:

1. An improved plug valve of the type having a rotatable plug connected to retractable slips within the valve body and a flow passage through the plug for alignment with the inlet and outlet of the valve when the plug is in the opened configuration, the improvement comprising:
   the interior surface of said valve body defining a first cone;
   the plug surfaces adjacent said flow passage defining a second cone;
   the slip surfaces adjacent said interior surface defining a third cone;
   the plug surfaces adjacent said slips defining a pair of intersecting planes;
   said first and third cones being substantially congruent, said second cone being substantially similar to but smaller than said first cone, the apices of said first, second and third cones being located along the rotational axis of said plug on the same axial side of said plug, the intersection of said intersecting planes being on the opposite axial side of said plug from said apices.

2. A plug-type valve having slips wherein the valve is opened by moving the plug vertically to retract the slips, rotating the plug to align a flow passage with an inlet and an outlet and wherein the plug is again moved vertically to seat the plug against the interior surface of the valve body, the valve comprising:
   a valve body having an interior surface in the shape of a truncated cone;
   said slips having conical surfaces which are substantially congruent to said valve body interior surface;
   said plug having surfaces adjacent said flow passage in the shape of a second truncated cone, said second truncated cone being substantially similar to but smaller than said first truncated cone;
   whereby said vertical motion of said plug both before and after said rotation of said plug is in the same direction.

3. A plug-type valve having a rotatable plug having a flow passage and connected to a pair of slips and comprising:
   means for moving said plug vertically for retracting said slips for opening said valve;
   means for rotating said plug for aligning said flow passage in the flow path of said valve; and
   means for moving said plug vertically for seating said plug in the open position;
   said vertical movement produced by said means for retracting and said vertical movement produced by said means for seating, being unidirectional.

4. A plug valve of the type having a rotatable plug, a pair of slips connected to the plug for rotation with the plug, a flow passage through the plug, and a valve body having an inlet and an outlet for connecting the valve to upstream and downstream pipes; the valve comprising:
   a valve body having a conically shaped interior surface for housing said plug and slips;
   said slips each having an outer facing conical surface substantially congruent to said valve body interior surface and having a substantially planar inner facing surface adapted for slideable engagement with said plug;
   said plug having slip interface surfaces canted to retract said slips from said valve body interior surface upon vertical motion of said plug;
   said plug having conical surfaces adjacent said flow passage, said conical surfaces being parallel to the conical interior surface of said valve body;
   said valve being opened and closed by a sequence of vertical, rotational and vertical motions, the vertical motions for opening said valve being unidirectional and the vertical motions for closing said valve being unidirectional.

* * * * *